United States Patent [19]

Madrona

[11] Patent Number: 4,760,860
[45] Date of Patent: Aug. 2, 1988

[54] VALVE FOR TUBELESS TIRE

[75] Inventor: Gilbert Madrona, Sauviat, France

[73] Assignee: Compagnie Generale Des Etablissements Michelin, Clermont-Ferrand, France

[21] Appl. No.: 71,480

[22] Filed: Jul. 9, 1987

[30] Foreign Application Priority Data

Jul. 24, 1986 [FR] France ................. 86 10872

[51] Int. Cl.⁴ .................................. B60C 29/02
[52] U.S. Cl. ................... 137/223; 152/427; 152/DIG. 11
[58] Field of Search ........... 152/427, 429, DIG. 11; 137/223

[56] References Cited

U.S. PATENT DOCUMENTS

| | | | |
|---|---|---|---|
| 2,225,472 | 12/1940 | Franklin | 152/427 UX |
| 2,835,305 | 5/1958 | Boyer | 152/DIG. 11 X |
| 2,998,044 | 8/1961 | Sloueken | 152/427 X |
| 4,049,037 | 9/1977 | Gale | 152/427 |
| 4,364,427 | 12/1982 | Lefrancoie | 152/429 X |
| 4,411,302 | 10/1983 | Kuyperg | 152/427 |

FOREIGN PATENT DOCUMENTS 6500  1/1980  European Pat. Off. ........... 152/427

Primary Examiner—John Rivell
Attorney, Agent, or Firm—Brumbaugh, Graves, Donohue & Raymond

[57] ABSTRACT

A valve for tubeless tires is of the type having elements which are radially flexible so that the elements can be deformed upon passage through a valve hole provided in a rim but which are axially rigid so as to hold the mounted valve on the rim. These elements are designed in such a manner that they cannot pass through the valve hole from the outside of the rim towards the inside under the effect of even the strongest forces. For this purpose, the lower part of these elements has, for example, a greater curvature than the curvature of the valve body.

6 Claims, 2 Drawing Sheets

VALVE FOR TUBELESS TIRE

BACKGROUND OF THE INVENTION

The present invention relates to valves for tubeless tires. More particularly, it relates to the fastening of the valves on a rim.

From French patent No. 2,385,548 a valve for a tubeless tire is known which has, on the periphery of the portion of the valve body located after mounting on the outside of the rim, elements which are elastic in radial direction and rigid in axial direction. The radial and axial directions are defined here with respect to the axis of the valve. It results from this that the mounting of the valve is effected very easily by introducing the valve from the inside of the rim into the valve hole provided in the rim and pushing the valve towards the outside of the rim. The elements move towards the valve body (stated differently, they move back upon passage through the valve hole) and then move away from the valve body to assume their final position in which the mounted elements rest axially against the outer face of the rim. The holding in place and tightness are assured by the compressing of a sealing joint between the valve base and the inner face of the rim.

The fastening of this type of valve on the rim may raise certain difficulties in case of extreme stresses. In fact, due to their deformability in radial direction, the elastic elements can slide radially towards the outside or else even slide radially towards the inside, if the shape of the edge of the valve hole provided on the rim favors a movement of radial approach towards the valve body and therefore fall axially towards the inside of the rim, no longer assuring their holding role. From this there may result a tilting of the valve and therefore a decompression of the sealing joint, which may be accompanied by a loss of pressure of the tire.

SUMMARY OF THE INVENTION

The object of the present invention is to assure a better holding of the elastic elements when they are acted on by large forces, for instance, due to the centrifugal force which is applied to the valve, so that they can at all times hold the valve immovable with respect to the rim, even when the valve hole is of imperfect shape.

According to the invention, the valve for tubeless tires, of the type having a valve body around which elements which are elastic in radial direction and rigid in axial direction are arranged, the elastic elements being capable of moving towards the valve body in order to pass through a valve hole provided in a rim and then move away towards their final position to assure the fastening of the valve on the rim, is characterized by the fact that the size in radial direction of the elastic elements, in final position, is greater than the clearance formed by one-half of the difference between the diameter of the valve hole and the outside diameter of the valve body.

DESCRIPTION OF THE DRAWING

The drawing shows one embodiment of the invention by way of illustration and not of limitation.

DETAILED DESCRIPTION OF THE INVENTION

Figure 1:
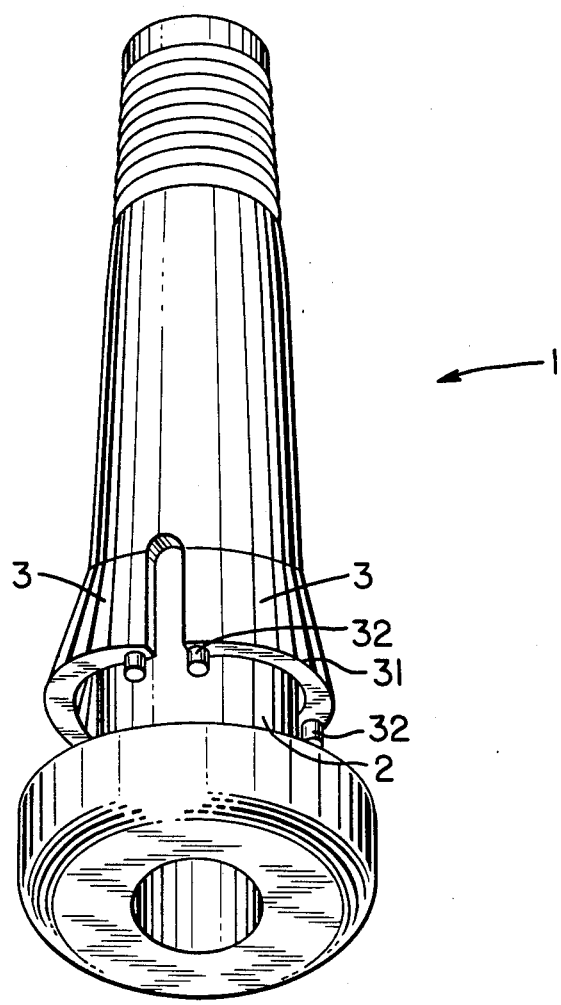
FIG. 1 is a perspective view showing a valve according to the invention.
Figure 2:
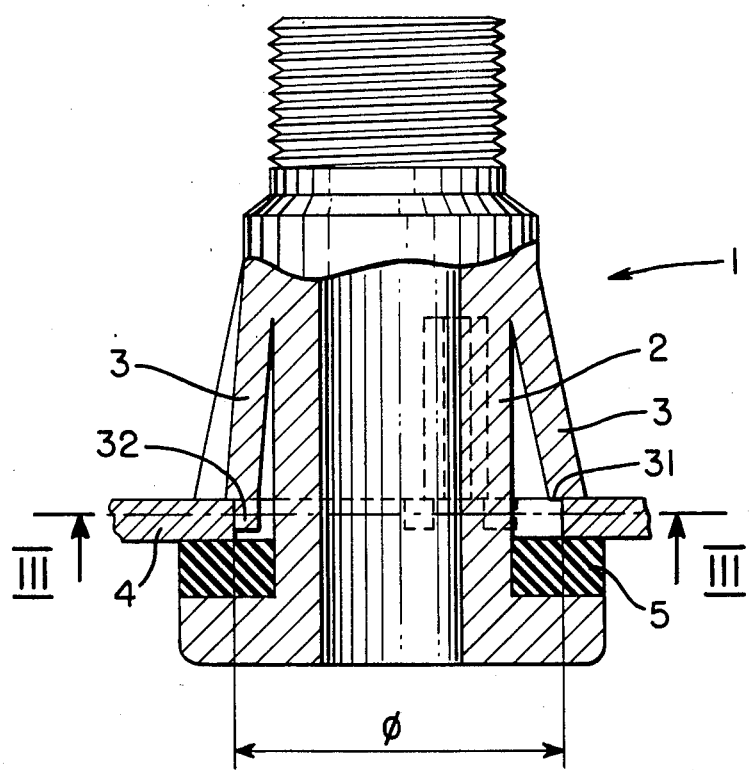
FIG. 2 is a view in elevation, with partial sections along the lines AA and BB of FIG. 3.

FIGS. 1 and 2 show a valve 1 having a valve body 2 around which elastic elements 3 are arranged. These elastic elements 3 are, as known per se, shaped in such a manner as to deform upon passage through a valve hole provided in a rim 4.

Figure 3:
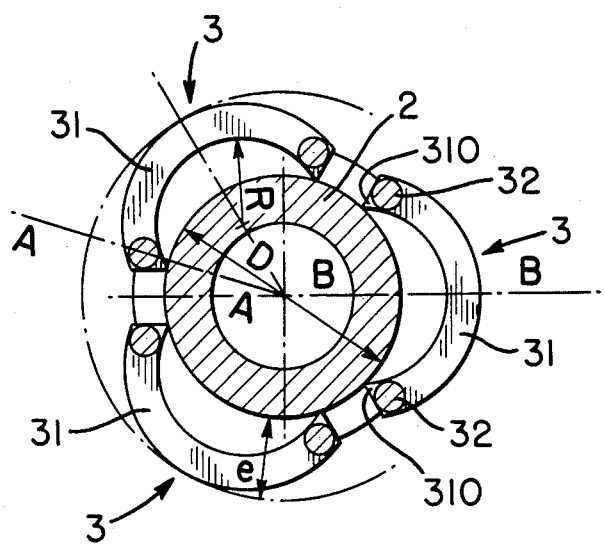
FIG. 3 is a section along the line III—III of FIG. 2, without showing the rim, in order not to clutter the drawing.

In FIG. 3, "e" is the size in radial direction of the elastic elements 3. When the valve 1 is mounted on a rim 4, this size "e" is greater than the clearance defined by one-half of the difference between the diameter $\phi$ of the valve hole and the outside diameter D of the body 2 of the valve 1 (see FIGS. 2 and 3).

The shape of the axially inner end 31 of the elastic elements 3 is such that the radially inner face of the axially inner end 31 has, in a plane perpendicular to the axis of the valve 1, a curvature whose radius R (see FIG. 3) is less than one-half of the outside diameter D of the valve body 2.

Each elastic element 3 preferably rests, in final position, radially inward against the valve body 2 by means of two regions 310 located at the ends of the elastic elements 3. This application must be present at least in final position (valve mounted). In the example described, the shape of the valve 1, in final position, corresponds substantially to the initial shape of the valve 1.

Due to the shape of these elastic elements 3, the moment of inertia in flexure of the elements 3 is considerably increased as compared with the prior art and therefore there is less tendency on the part of these elements 3 to move away or radially approach the body 2 of the valve 1. Due to the radially inward application, any radial approach is even made impossible without deforming an element 3.

The holding of the elastic elements 3 can also be improved by preventing them furthermore from moving radially towards the outside. For this, it is necessary that the axially inner end 31 of the elastic elements 3 rests, in final position, radially outward against the rim 4. For this purpose, the axially inner end 31 comprises at least one protuberance 32 which extends axially inward and, in final position, is located radially between the valve body 2 and the rim 4.

Thus the putting in place of the valve 1 causes deformation by decrease of the curvature of the elastic elements 3 passing through the valve hole; it terminates with a compressing of a sealing joint 5 (FIG. 2) and release of the deformation stresses of the elastic elements 3 which are then resting axially against the outer surface of the rim 4 and radially against both valve body 2 and the rim 4. The elastic elements 3 are thus perfectly blocked and the valve 1 is firmly held in place.

The protuberances 32 also make it possible to maintain the valve 1 centered with respect to the valve hole provided on the rim 4. If such protuberances 32 were not provided, the centering would be assured only by the deformation of the sealing joint 5 resulting from its compression. This may at times be insufficient to maintain the centered position in operation. In such case it is preferable that the size "e" in the radial direction of the elastic elements 3, in final position, be greater than the clearance formed by the difference between the diameter $\phi$ of the valve hole and the outside diameter D of the body 2 of the valve 1. Due to this, even if the valve 1 becomes out of center to such an extent that the valve body 2 rests against the rim 4, the elastic element 3 on the other side cannot slide towards the inside of the rim 4.

By these arrangements, one very effectively prevents any accidental falling of the elastic elements 3 into the rim hole, the forces to which the valve 1 is subjected in operation never being sufficient to cause a "swallowing" of the elastic elements 3 by the valve hole of the rim 4.

What is claimed is:

1. A valve for tubeless tires, of the type having a valve body around which elements which are elastic in radial direction and rigid in axial direction are arranged, the elastic elements being capable of moving towards the valve body in order to pass through a valve hole provided in a rim and then move apart towards their final position to assure the fastening of the valve on the rim, characterized by the fact that the radial dimension of each elastic element, in final position after passing through the valve hole, is greater than the clearance formed by one-half of the difference between the diameter of the valve hole and the outside diameter of the valve body, the clearance decreasing the radial dimensions of the elastic elements on passing through the valve hole, the elastic elements reassuming their full dimensions when the elastic elements pass through the valve hole so that at least parts of the inner ends of the elements overlie and engage the rim surface.

2. A valve according to claim 1, characterized by the fact that at least one region of the axially inner end of each elastic element rests, in fianl position, radially inward against the valve body with the inner end of each element spanning the clearance.

3. A valve according to claim 1, characterized by the fact that the radially inner face of the axially inner end of the elastic elements has, in a plane perpendicular to the axis of the valve, a curvature whose radius is less than one-half of the outside diameter of the valve body.

4. A valve according to claim 1, characterized by the fact that the axially inner end of each elastic element comprises at least one protuberance which extends axially inward and, in final position, is located radially between the valve body and the rim.

5. A valve according to claim 1, characterized by the fact that the size in radial direction of the elastic elements, in final position, is greater than the clearance formed by the difference between the diameter of the valve hole and the outside diameter of the valve body.

6. A valve according to claim 1 in which the inner end of each elastic element includes a pair of spaced apart regions which engage the outer surface of the valve body and an intermediate span between said two valve body engaging regions which extends radially outwardly, said clearance decreasing the radial dimension of the intermediate span and spreading apart the valve body engaging regions in passing through the valve hole in the rim, the elastic element reassuming its shape when the elastic element passes through the valve hole so that in the final position the intermediate span overlies and engages the rim surface.

* * * * *